May 20, 1969  G. F. WEBB  3,444,910
CRACKING APPARATUS
Filed Feb. 13, 1967
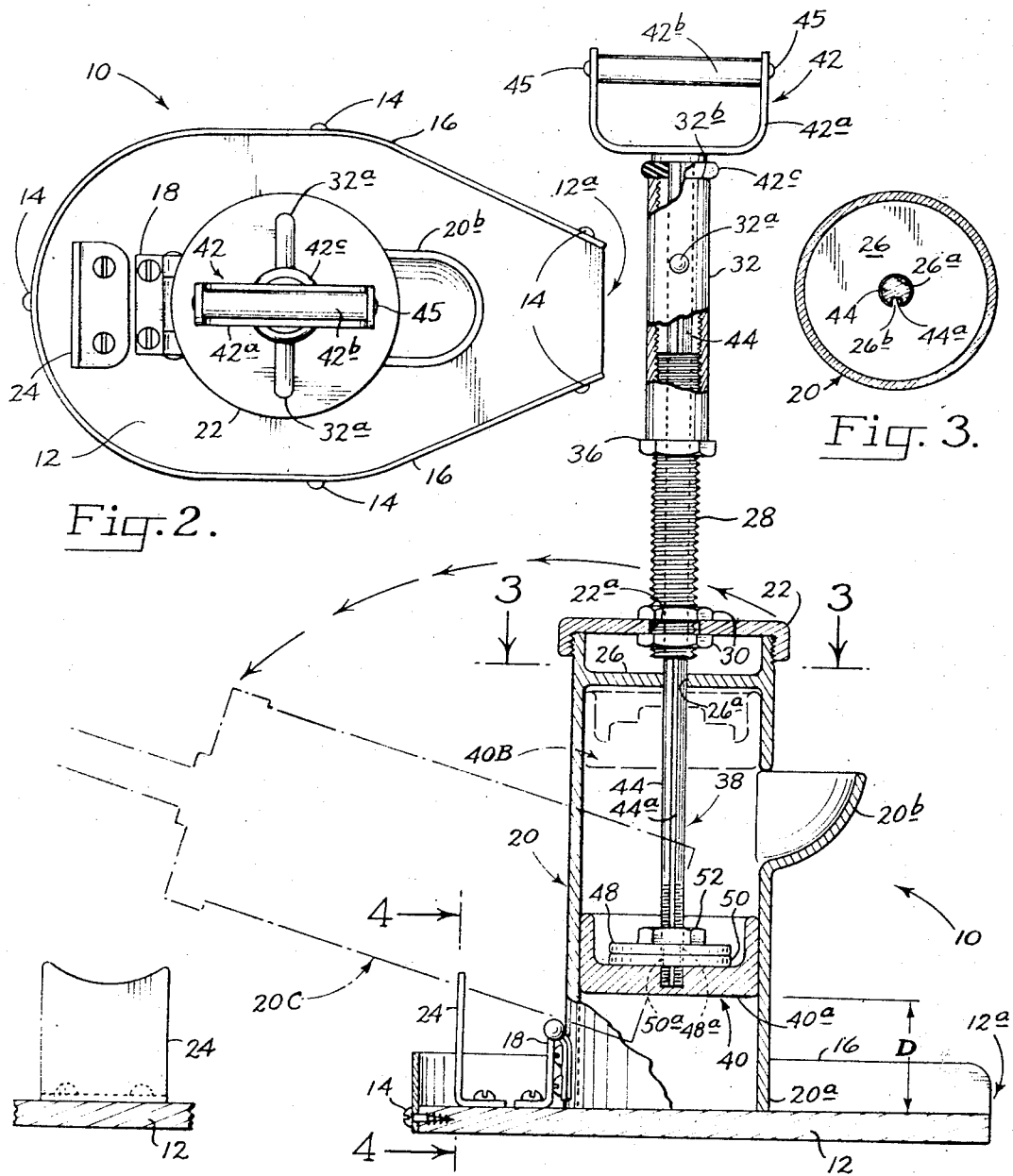
Gardello F. Webb
INVENTOR
BY
Kolisch + Hartwell
Attys.

United States Patent Office 3,444,910
Patented May 20, 1969

3,444,910
CRACKING APPARATUS
Gardello F. Webb, P.O. Box 335, Dallas, Oreg. 97338
Filed Feb. 13, 1967, Ser. No. 615,661
Int. Cl. A23n; A47j 43/26; B30b 7/00
U.S. Cl. 146—16
9 Claims

ABSTRACT OF THE DISCLOSURE

A cracking apparatus for cracking nutshells and like articles having a base, a plunger which is movable toward the base to crack articles positioned between the base and plunger, and stops for limiting the travel of the plunger including a movable stop which may be adjusted to vary the amount of travel permitted the plunger toward the base.

The present invention relates to cracking apparatus, and more particularly, to such apparatus which may be used for cracking nutshells and like crackable articles. For purposes of illustration herein, a preferred embodiment of the invention is described in connection with the cracking of shells of various edible nuts.

As is well known, most nuts of the edible variety, such as walnuts and chestnuts, include a relatively hard, protective, outer shell, called a nutshell, and a more-or-less distinct, relatively soft, edible, separable kernel or fruit within the shell. In cracking a nutshell to free and separate the kernel from the shell, it is usually desirable to accomplish such cracking with as little destruction of the kernel as possible. A principal reason for this is that if a kernel is broken up into too many parts during cracking of the shell, the task of segregating the shell and kernel parts becomes very difficult and time-consuming. Also, there are many times when intact or large pieces of kernel are wanted.

Thus, if cracking apparatus is to perform satisfactorily, the apparatus must be readily controllable to produce just the right cracking action to break open a shell, but at the same time to leave the kernel substantially intact. Also, such apparatus, to be versatile, should be capable of adjustment to accommodate differences that exist between different sizes and kinds of nuts.

A general object of the present invention, therefore, is to provide novel apparatus for cracking nutshells and like articles which affords to the user thereof a substantial degree of control over the cracking action.

Another object is to provide such cracking apparatus which is readily adjustable to take into account differences that exist between various crackable articles, such as nuts of different sizes and types, whereby the apparatus is operable to produce just the right cracking action for a wide variety of articles.

More particularly, an object of the invention is to provide such cracking apparatus which includes, in general terms, a base on which articles to be cracked may be placed, a movable plunger mounted for reciprocal movement toward and away from the base including a head member adapted, with movement of the plunger toward the base, to crack articles placed thereon, stops for limiting the travel of the plunger including a movable stop which is movable relative to the base to limit the travel of the plunger toward the base, and an adjustable member operatively connected to the movable stop adjustable to vary the position of the stop relative to the base, whereby the cracking action producible on movement of the plunger head toward the base may be controlled.

With such a construction, adjustment may be made in the apparatus to limit the travel of the plunger toward the base whereby, in cracking articles such as nuts, the plunger head may be operated to travel far enough toward the base to crack the shells of such nuts, but not so far as to crush the kernels inside the shells. Additionally, with such adjustment possible, the apparatus can readily be used with a wide variety of nuts of different types and sizes.

Yet another object of the invention is to provide cracking apparatus of the type so far described, wherein the plunger further includes plural, removable weights which are removably mounted on the head member. Such removable weights enable adjustment of the overall weight of the plunger, and thus further facilitate control over the cracking action.

These and other objects and advantages attained by the invention will become more fully apparent as the description which follows is read in conjunction with the accompanying drawings, wherein:

FIG. 1 is a side elevation, partly in cross section, illustrating cracking apparatus as contemplated herein, with a container that forms part of the apparatus illustrated in one position in solid outline, and in another position in dash-dot outline;

FIG. 2 is a plan view, on the same scale as FIG. 1, of the apparatus shown in FIG. 1;

FIG. 3 is a cross-sectional view, taken generally along the line 3—3 in FIG. 1; and FIG. 4 is a fragmentary cross-sectional view taken along the line 4—4 in FIG. 1 illustrating a rest that forms part of the apparatus of FIG. 1.

Turning now to the drawings, and with reference first to FIGS. 1 and 2, illustrated generally at 10 is cracking apparatus as contemplated herein. Forming part of the apparatus is an elongated, substantially flat base 12 which includes a discharge end 12a, and which has, when viewed from above as in FIG. 2, a somewhat pear-shaped outline. The base may be formed of any suitable material such as wood, and functions to support articles, such as nutshells, that are to be cracked.

Secured by means of screws 14 around the outside of the base, except along the margin thereof adjoining end 12a, is an elongated rim member 16 that forms a retaining rim projecting above the upper surface of the base.

Mounted on top of the base by means of a hinge, or pivot means, 18 is an upright, hollow, substantially cylindrical container 20 which is adapted to receive and contain articles to be cracked by the apparatus. The container includes a normally open bottom end 20a, which, with the container positioned upright over the base as illustrated, is closed off by the top surface of the base. Above bottom 20a is an inlet 20b through which articles may be introduced into the interior of the container. The top of container 20 is closed off by a cap 22 which is screwed onto the upper end of the container.

As can readily be seen in FIG. 1, hinge 18 provides a pivot axis spaced above the top surface of base 12 about which the container can be swung. In particular, the container is adapted to be swung from the upright, or operative, position in which it is shown in solid outline away from the base to a positon shown in dash-dot outline at 20C. In position 20C, the longitudinal axis of the container is nearly horizontal, and the open bottom thereof is exposed. In order to provide support for the container when the same occupies position 20C, an upright rest 24 (FIGS. 1, 2, 4) is provided which is mounted on the base to the left of the container in FIG. 1.

Formed on the inside of container 20 above inlet 20b is a projection, or first stop, 26. In the embodiment shown, this projection takes the form of a cylindrical web that is integral with the container and that extends transversely of the longitudnal axis thereof. Considering FIGS. 1 and 3 together, web 26 is provided with a central bore 26a and a key 26b that extends radially into bore 26a.

An elongated, hollow, cylindrical, externally threaded post 28 is mounted on top of cap 22 and projects upwardly therefrom through a central bore 22a provided in the cap. The post is anchored in place on the cap by means of a pair of locking nuts 30 which are screwed onto the outside of the post, and tightened against the upper and lower surfaces of the cap. Also screwed onto the post, above cap 22, is a cylindrical collar, or adjustable member, 32 which has a pair of outwardly projecting handles 32a for turning the same on the post. Adjacent its upper end, collar 32 has an upwardly facing, annular surface 32b. This surface comprises what is referred to hereinto as a second stop. With turning of the collar on the post, it will be apparent that the collar, and hence surface 32b, is movable vertically relative to the post. A suitable locking or anchoring nut 36 is provided for locking collar 32 and surface 32b in place on the post.

The cracking apparatus further comprises a plunger indicated generally at 38 in FIG. 1. The plunger is mounted for reciprocation relative to the container, and includes a head member 40, a handle assembly 42, and an elongated shank 44 interconnecting the head member and handle assembly. Head member 40 has a somewhat cup-shaped configuration, and includes a flat bottom surface 40a facing downwardly toward the top surface of base 12. The hear member is screwed onto the lower end of shank 44, and is freely received within the interior of container 20 for reciprocal movement therein along the longitudinal axis of the container.

Shank 44 projects upwardly from head member 40 through bore 26a in web 26, and longitudinally through the hollow interior of post 28. As can be seen in FIGS. 1 and 3, shank 44 includes an elongated keyway 44a extending longitudinally along the side thereof which registers with key 26b. Registry of key 26b and keyway 44a, prevents rotation of the shank (and hence of the plunger) about its longitudinal axis.

Handle assembly 42 includes a U-shaped member 42a secured in any suitable fashion to the upper end of shank 44, and a hand grip member 42b mounted on member 42a by fasteners 45. Provided adjacent the base of the handle assembly, and forming a part thereof, is a washer-shaped cushioning device 42c which surrounds shank 44. Device 42c may be made of any suitable resilient material, such as rubber.

Also forming part of plunger 38 are plural removable weights, such as weights 48, 50, which are mounted on head member 40. In the embodiment shown, the weights take the form of cylindrical discs provided with central bores 48a, 50a to accommodate shank 44. The weights are held in place on the head member by means of a suitable locking nut 52.

While two weights are illustrated mounted on the head member, it should be understood that more or less of such weights may easily be employed. Mounting and removal of a weight may be accomplished by tilting the container to position 20C where it is supported on rest 24, shifting the plunger whereby the head member thereof extends through and out of the open bottom of the container, and unscrewing the head member from the shank whereby a weight may easily be slipped past the lower end of the shank. By varying the number of weights which are mounted on the head member, the overall weight of the plunger may be adjusted.

Considering briefly the reciprocal movement permitted plunger 38 relative to container 20, this is determined by stops 26, 32b. Travel of the plunger away from end 20a of the container is limited by fixed stop 26 which is adapted to engage head member 40 when the latter has traveled to position 40B (dashed outline) inside the container. On the other hand, travel of the plunger in the opposite direction toward end 20a is limited by movable stop 32b which is adapted to engage cushioning device 42c. The final position which will be occupied by head member 40 upon such engagement of device 42c and stop 32b will, of course, depend upon the position of collar 32 on post 28. In particular, the lower the collar is on post 28, the closer the head member will be to end 20a. Conversely, the higher the collar is on the post, the farther the head member will be from the end 20a.

In FIG. 1, collar 32 is shown adjusted to a position on post 28 where, with device 42c engaging surface 32b, surface 40a of the head member is spaced from the lower end of the container (and hence from the top of base 12) by a distance D.

Explaining now how the cracking apparatus may be used to crack articles such as nutshells, for a given type and size of nut, an appropriate number of weights such as weights 48, 50 (if any are to be used) are mounted on head member 40. Collar 32 is adjusted on post 28 whereby downward travel of the plunger, with the container in upright position over base 12, is sufficient to shift head member 40 close enough to the top of the base to cause cracking of the shells of nuts placed on the base, but not so far as to cause breaking up of the kernels within the shells. The number of weights to use, and the proper position for collar 32, for various types of nuts, is easily determined from experience.

The plunger is shifted upwardly to place the head member in position 40B, and nuts are introduced into the interior of the container through inlet 20b. A sufficient number of nuts are introduced to form a single layer covering the region of the top surface of base 12 which faces the interior of the container.

The plunger is then thrust downwardly from its raised position to produce cracking of the nutshells, and, as previously indicated, downward movement of the plunger is stopped when cushioning device 42c engages surface 32b on the top of the collar.

The container is then tilted to position 20C, and with the container supported in such position by rest 24, base 12 is tilted toward end 12a whereby the nut kernels and cracked shells are discharged from the apparatus. Rim member 16 prevents any discharge from occurring other than from end 12a. The container may then be returned to an upright position to receive more nuts for cracking.

Thus, the invention provides cracking apparatus which, through adjustment of the position of collar 32 and the number of weights added on top of head member 40, affords a considerable degree of control over the cracking operation which is possible. Within the range of travel permitted the plunger, during the cracking of nutshells, the plunger may be thrust downwardly toward the base with a sufficient amount of force to produce cracking of the shells of nuts placed on the base without fear of the plunger moving so far as to crush the kernels inside the shells.

The apparatus is relatively simple to operate, and enables a fairly large number of articles to be cracked in a single operation.

While an embodiment of the invention has been described herein, it is appreciated that variations and modifications may be made without departing from the spirit of the invention, and it is desired to cover all such variations and modifications that would be apparent to one skilled in the art and which come within the scope of the appended claims.

It is claimed and desired to secure by Letters Patent:

1. Apparatus for cracking nutshells and like crackable articles, in operative position comprising
  a base for supporting articles to be cracked,
  a plunger mounted for movement reciprocally toward and away from the base,
  a first stop occupying a fixed position relative to said base, mounted adjacent the plunger for limiting travel of the plunger away from the base, a movable second stop, movable relative to the first stop and anchorable in different fixed positions relative thereto, mounted adjacent the plunger for limiting travel of the plunger toward the base, and an adjustable member operatively connected to said second stop adjustable to vary the position of said second stop relative to said first stop, thereby to vary the amount of travel toward the base permitted the plunger.

2. The apparatus of claim 1, wherein said base faces upwardly, and which further comprises a hollow container having an open bottom disposed over said base, adapted to receive and form an enclosure about articles supported on the base for cracking, and wherein said plunger includes a head member mounted for reciprocation within the interior of said container, and said head member, upon movement of said plunger toward said base, is engageable with articles on the base to crack such articles.

3. The apparatus of claim 2, wherein said first stop comprises a projection which is joined to said container and which projects into the interior of the container at a location above said head member, and said first stop limits the upward travel of said plunger by engaging said head member.

4. The apparatus of claim 3, wherein said plunger further includes an elongated shank mounted on said head member projecting upwardly therefrom and through the top of said container, and a handle assembly mounted adjacent the top of said shank, and said second stop is positioned above the top of said container intermediate the container and handle assembly, and limits the downward travel of said plunger by engaging the handle assembly.

5. The apparatus of claim 4, wherein said adjustable member is interposed between said second stop and the top of said container and is adjustable vertically to shift said second stop toward and away from the top of said container.

6. The apparatus of claim 5, wherein said second stop and said adjustable member comprise a unitary structure with the former taking the form of an upwardly facing surface on the latter.

7. The apparatus of claim 2, wherein said plunger further includes plural, removable weights removably mounted on said head member for movement with the head member, said weights being removable to vary the overall weight of the plunger.

8. The apparatus of claim 2 which further comprises pivot means pivotally interconnecting the container and base enabling the container to be swung away from the base to expose the open bottom of the container, and a rest for supporting the container in a position where it is swung away from the base.

9. The apparatus of claim 8, wherein said container includes an inlet located above the bottom thereof through which articles to be cracked may be introduced into the interior of the container.

References Cited

UNITED STATES PATENTS

| | | | |
|---|---|---|---|
| 2,506,822 | 5/1950 | Williamson | 146—16 |
| 2,695,642 | 11/1954 | White | 146—16 |

JAMES M. MEISTER, *Primary Examiner.*

U.S. Cl. X.R.

100—257